United States Patent
Gu et al.

(10) Patent No.: US 9,195,900 B2
(45) Date of Patent: Nov. 24, 2015

(54) SYSTEM AND METHOD BASED ON HYBRID BIOMETRIC DETECTION

(71) Applicant: PIXART IMAGING INC., Hsin-Chu (TW)

(72) Inventors: Ren-Hau Gu, Hsin-Chu (TW); Ming-Tsan Kao, Hsin-Chu (TW); Sen-Huang Huang, Hsin-Chu (TW)

(73) Assignee: PIXART IMAGING INC., Hsin-Chu City (TW)

( * ) Notice: Subject to any disclaimer, the term of this patent is extended or adjusted under 35 U.S.C. 154(b) by 0 days.

(21) Appl. No.: 14/629,764

(22) Filed: Feb. 24, 2015

(65) Prior Publication Data

US 2015/0193669 A1  Jul. 9, 2015

Related U.S. Application Data

(63) Continuation-in-part of application No. 13/683,657, filed on Nov. 21, 2012, now abandoned.

(30) Foreign Application Priority Data

Nov. 21, 2011 (TW) .............................. 100142604 A

(51) Int. Cl.
*G06K 9/00* (2006.01)
*G01N 33/48* (2006.01)
*G06K 9/46* (2006.01)
*G06K 9/62* (2006.01)
*H04N 7/18* (2006.01)

(52) U.S. Cl.
CPC .............. *G06K 9/46* (2013.01); *G06K 9/00013* (2013.01); *G06K 9/00604* (2013.01); *G06K 9/00892* (2013.01); *G06K 9/6201* (2013.01); *H04N 7/18* (2013.01); *G06K 2009/00932* (2013.01); *G06T 2207/30076* (2013.01)

(58) Field of Classification Search
None
See application file for complete search history.

(56) References Cited

U.S. PATENT DOCUMENTS

| | | | | |
|---|---|---|---|---|
| 8,260,391 | B2 * | 9/2012 | Hoarau | A61B 5/14552 600/323 |
| 8,388,543 | B2 * | 3/2013 | Chon | A61B 5/0806 600/484 |
| 9,113,830 | B2 * | 8/2015 | Galen | A61B 5/726 |
| 2004/0077934 | A1 * | 4/2004 | Massad | A61B 5/1135 600/300 |
| 2005/0070774 | A1 * | 3/2005 | Addison | A61B 5/14551 600/323 |
| 2005/0281442 | A1 * | 12/2005 | Miura | G06K 9/00006 382/124 |
| 2006/0258921 | A1 * | 11/2006 | Addison | A61B 5/0002 600/323 |
| 2007/0189583 | A1 * | 8/2007 | Shimada | G06K 9/2018 382/118 |

(Continued)

*Primary Examiner* — Randolph I Chu
(74) *Attorney, Agent, or Firm* — Muncy, Geissler, Olds & Lowe, P.C.

(57) ABSTRACT

A system and method based on hybrid biometric detection capture first images of a user that is projected by first light of different wavelengths, extract various biometric informations from the first images, analyze and compare for each of the biometric informations to generate a matching score, determine an identity for the user according to all of the matching scores, generate second images and PPG signals from dispensed second light from the user, generate a time and PPG variation signal and a space and PPG variation signal for each frame of the second images, convert the time and PPG variation signals into frequency domain signals, determine a reference frequency according to the space and PPG variation signals, retrieve energy of the frequency domain signals at the reference frequency, and establish a three-dimensional energy distribution from the retrieved energy.

30 Claims, 7 Drawing Sheets

(56) References Cited

U.S. PATENT DOCUMENTS

| | | | | |
|---|---|---|---|---|
| 2009/0326353 | A1* | 12/2009 | Watson | A61B 5/14551 600/330 |
| 2011/0216947 | A1* | 9/2011 | Hosoi | G06K 9/00288 382/116 |
| 2014/0016833 | A1* | 1/2014 | Ide | G06K 5/0806 382/115 |
| 2014/0128697 | A1* | 5/2014 | Parfenova | A61B 5/4818 600/328 |
| 2014/0257061 | A1* | 9/2014 | Watson | A61B 5/14551 600/323 |
| 2015/0065830 | A1* | 3/2015 | Karp | A61B 5/14552 600/331 |
| 2015/0093729 | A1* | 4/2015 | Plans | G10H 1/0025 434/236 |
| 2015/0190062 | A1* | 7/2015 | Han | A61B 5/7221 600/479 |
| 2015/0271329 | A1* | 9/2015 | Deshmukh | H04M 3/5175 379/265.06 |

* cited by examiner

SYSTEM AND METHOD BASED ON HYBRID BIOMETRIC DETECTION

CROSS-REFERENCE TO RELATED APPLICATIONS

This application is a continuation-in-part of U.S. patent application Ser. No. 13/683,657 entitled "Identity Recognition System And Method Based On Hybrid Biometrics," filed on Nov. 21, 2012, now co-pending, which claims foreign priority from Taiwan Patent Application No. 100142604, filed on Nov. 21, 2011, the entire contents of each of which are incorporated herein by reference.

FIELD OF THE INVENTION

The present invention is related to a system and method based on hybrid biometric detection.

BACKGROUND OF THE INVENTION

Biometrics is used for identity recognition, which is based on individual unique biometric information such as fingerprint, face, veins, iris, and retinas. Fingerprint recognition has been extensively used and also become a useful tool for criminal investigation, but fingerprints are relatively easy to duplicate. Vein recognition relies on vein features extracted from the vein distribution in human hands, and thus is advantageous for providing high accuracy and reliability because individual vein distribution is unique and not easily forged. The underlying principle thereof is that the deoxygenated hemoglobin in veins absorbs infrared light and thus veins will be seen as dark lines in an image taken from human hands under projection of infrared light. Recognition then can be achieved according to vein features such as the pattern, distribution, width, color, etc. However, vein recognition is significantly affected by physical conditions of human body. For example, in cold days, veins may contract and become too thin to be sampled, and venous diseases may also cause vein recognition to be impossible. Face recognition relies on facial features such as the facial contour and relative positions of the five sense organs. This approach is convenient because an ordinary camera can be used to capture the image of a face. However, the captured sample for comparison tends to be interfered by facial expressions, ambient light, hair styles and so on, and is not distinguished between twins, and thus the accuracy of face recognition is an issue to be specially considered.

Biometrics has been extensively used in many applications such as information, communications, and security, for identity recognition. The development of biometrics has been made toward improvements in comparative performance and tolerance, which are typically measured by false acceptance rate (FAR) and false rejection rate (FRR). FAR is referred to the probability that an unauthorized user is accepted as an authorized user, and FRR is referred to the probability that an authorized user is mistaken for an unauthorized user and rejected. To any biometric system, there is always a tradeoff between comparative performance and tolerance. If tolerance is increased for convenience of authorized users (low FRR), an unauthorized user can pass examination easier (high FAR). If tolerance is decreased for preventing unauthorized users from access (high FAR), it is difficult for authorized users to pass examination (low FRR). Therefore, existing biometric systems are less flexible and very hard to balance operational convenience and high recognition rate. The false rate remains high no matter the comparative criteria are set strict or loose.

SUMMARY OF THE INVENTION

An objective of the present invention is to provide a biometric system and method advantageous in both operational convenience and high recognition accuracy.

Another objective of the present invention is to provide systems and methods based on hybrid biometric detection.

According to the present invention, a system based on hybrid biometric detection includes a light source configured to provide light of different wavelengths under control to project on a user, an image sensor configured to capture images of the user, a recognition module configured to extract various biometric informations from the images and analyze and compare for each of the biometric informations to generate a matching score, an analysis unit configured to determine an identity for the user according to all of the matching scores, and a biometric detection system to establish a three-dimensional energy distribution. The biometric detection system includes a second light source to emit to illuminate a skin surface of the user, a second image sensor to receive dispensed light from the user for generating PPG signals, a time frequency reducing unit to generate a time and PPG variation signal for each frame captured by the second image sensor, a space frequency reducing unit being to generate a space and PPG variation signal for each frame captured by the second image sensor, a converting unit to convert the time and PPG variation signals into frequency domain signals and determine a reference frequency according to the space and PPG variation signals, a capturing unit to retrieve energy of the frequency domain signals at the reference frequency; and a processing unit to establish the three-dimensional energy distribution from the output of the capturing unit.

According to the present invention, a method based on hybrid biometric detection includes providing first light of different wavelengths to project on a user, capturing images of the user, extracting various biometric informations from the images, analyzing and comparing for each of the biometric informations to generate a matching score, determining an identity for the user according to all of the matching scores, and establishing a three-dimensional energy distribution based on photoplethysmogram (PPG). To establish the three-dimensional energy distribution, second light is provided to emit to illuminate a skin surface of the user, second images are generated from the dispensed second light from the user, PPG signals are derived from the second images, time and PPG variation signals and space and PPG variation signals are generated for each frame of the second images, the time and PPG variation signals are converted into frequency domain signals, a reference frequency is determined according to the space and PPG variation signals, then energy of the frequency domain signals at the reference frequency is retrieved and processed to generate the three-dimensional energy distribution.

Due to the hybrid recognition of various biometric informations, it is achieved higher recognition accuracy, lower false acceptance rate, and lower false rejection rate. More specially, very high flexibility is allowed in terms of the criteria used for identity recognition.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
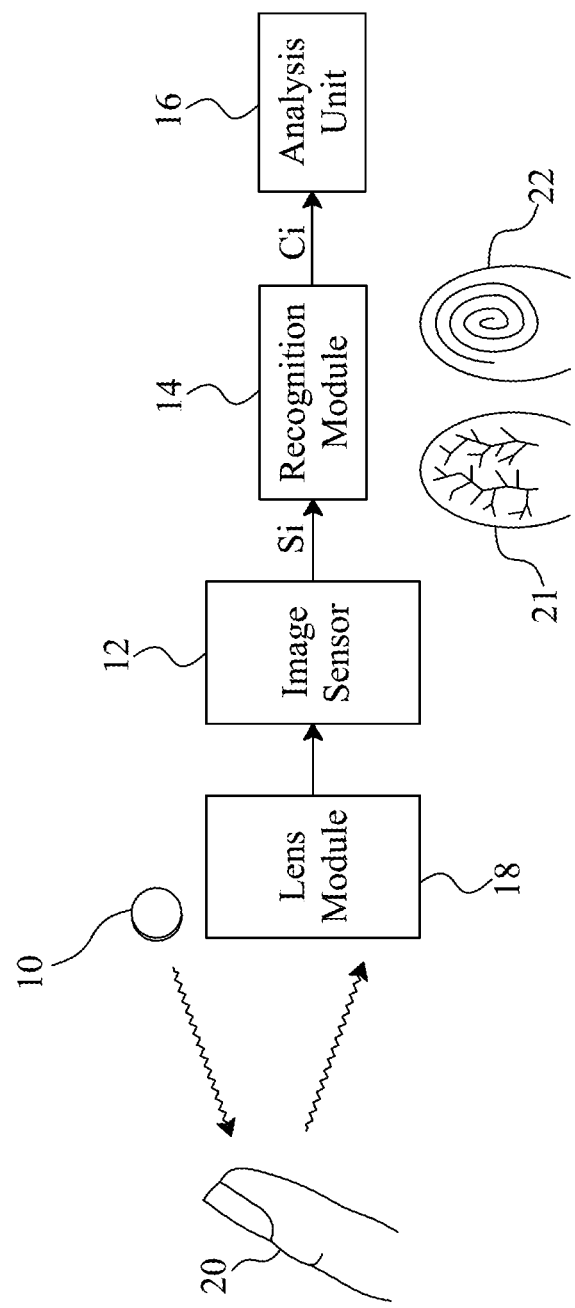
FIG. 1 shows an embodiment to capture various biometric informations from a finger for identity recognition.

In an embodiment according to the present invention, referring to FIG. 1, an identity recognition system includes a light source 10 configured to provide light of different wavelengths under control to project on a finger 20, an image sensor 12 configured to capture an image of the finger 20 to generate an image signal Si, a recognition module 14 configured to receive the image signal Si and extract various biometric informations from the received image, analyze and compare for each of the biometric informations to generate a matching score Ci, and an analysis unit 16 configured to determine an identity for the user under recognition according to all of the matching scores Ci. For obtaining better quality images, an autofocus lens module 18 may be provided between the image sensor 12 and the finger 20 for adjusting a focal length according to the location of the finger 20.

As shown in FIG. 1, various biometric informations are extracted from an image of the finger 20 for identity recognition. Veins in the finger 20 can absorb infrared light, which has longer wavelength, from the light provided by the light source 10, so that an image 21 mapping the vein distribution can be obtained. The fingerprint of the finger 20 is otherwise obtained by using blue or red light, which has shorter wavelength, to illustrate the surface of the finger 20 in the form of an image 22 of the fingerprint. Since the fingerprint and the veins are on and under the skin of the finger 20, respectively, the lens module 18 adjusts a focal length for capturing the images 21 and 22 from different depths of field.

Figure 2:
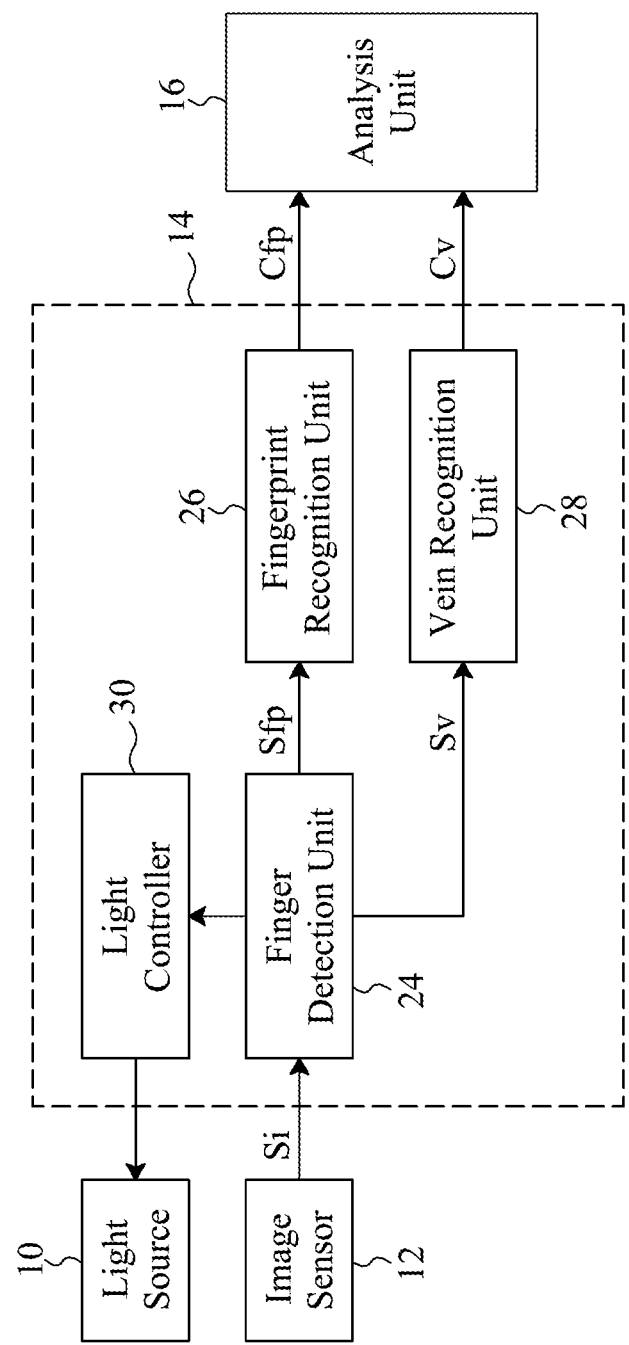
FIG. 2 is an embodiment of the recognition module shown in FIG. 1.

FIG. 2 is an embodiment of the recognition module 14 shown in FIG. 1. A finger detection unit 24 coupled to the image sensor 12 receives the image signal Si and analyzes the image to detect presence and location of a finger by using a finger feature or a brightness variation of the image. If a finger is detected, the finger detection unit 24 further extracts a fingerprint feature and a vein feature from the image. For example, the finger detection unit 24 may determine whether or not a finger is present based on whether or not a finger's outline, ridges of a fingerprint or other finger features is present in the image. Alternatively, the finger detection unit 24 may determine whether or not a finger is present according to the brightness variation of the overall image. The finger detection unit 24 will generate a fingerprint signal Sfp and a vein signal Sv according to the obtained fingerprint feature and vein feature for a fingerprint recognition unit 26 and a vein recognition unit 28, respectively. The fingerprint recognition unit 26 analyzes the fingerprint feature and compares it with fingerprint features preloaded in a fingerprint database to generate a fingerprint matching score Cfp. The vein recognition unit 28 analyzes the vein feature and compares it with vein features preloaded in a vein database to generate a vein matching score Cv. Then, according to the fingerprint matching score Cfp and the vein matching score Cv, the analysis unit 16 determines an identity for the user under recognition. Preferably, the recognition module 14 further includes a light controller 30, and the finger detection unit 24 generates a control signal according to the brightness of the captured image for the light controller 30 to adjust the light intensity of the light source 10, thereby optimizing the clarity of the image.

In one embodiment, the analysis unit 16 compares the sum of the fingerprint matching score Cfp and the vein matching score Cv with a threshold. If the sum is greater than the threshold, it is determined that the user under recognition is an authorized user. In the course of recognizing an authorized user, even if one or both of the biometric informations produce a relatively low matching score, their sum still will be much greater than the sum of the matching scores of an unauthorized user. Therefore, the risk of rejecting an authorized user can be much reduced, thereby significantly lowering the false rejection rate. On the contrary, in the course of recognizing an unauthorized user, even if either of the matching scores is relatively high, it would be offset by the other matching score where an unauthorized user is greatly different from an authorized user, and the resultant sum is always lower than the threshold, so that the risk of accepting an unauthorized user can be much reduced, thereby significantly lowering the false acceptance rate. In other words, in this system, even if less strict comparative criteria are used, the recognition accuracy can remain high.

In another embodiment, the analysis unit 16 compares the fingerprint matching score Cfp and the vein matching score Cv with two different thresholds, respectively, and only when the both are greater than the relevant thresholds, the user under recognition is determined as an authorized user. Even if less strict comparative criteria are used, it is difficult for an unauthorized user to pass the examination. Thereby, high recognition accuracy as well as low false acceptance rate and low false rejection rate can be achieved.

In a different embodiment, a weighted approach may be used. For example, the fingerprint matching score Cfp and the vein matching score Cv may be weighted differently to decrease or increase the influence of the fingerprint feature or the vein feature on identity recognition.

In other embodiments, various algorithms may be used for determination in the score thresholding.

Figure 3:
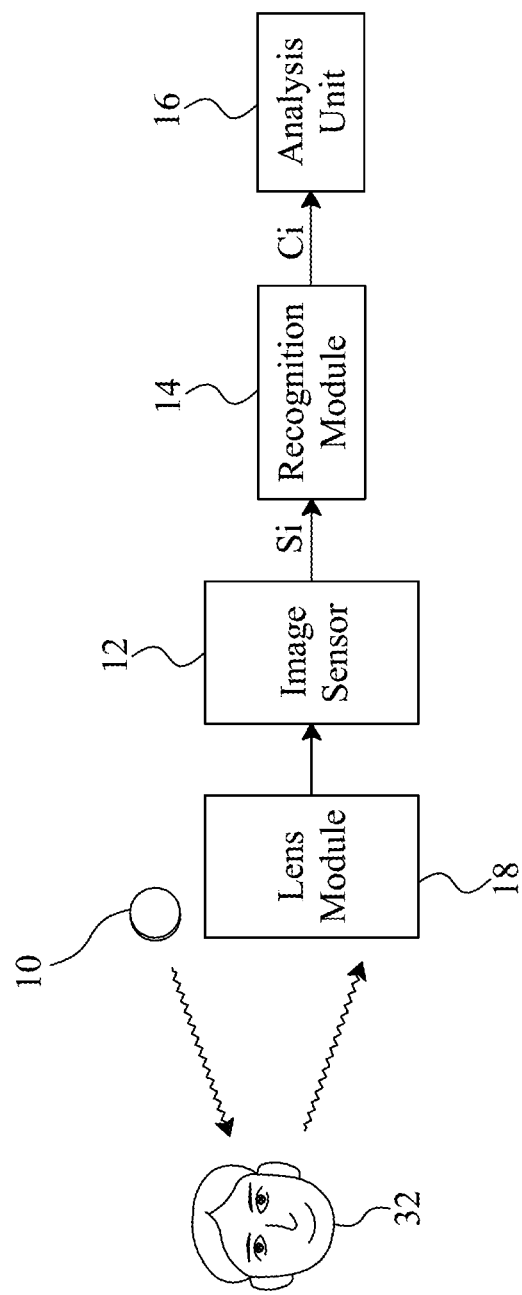
FIG. 3 shows an embodiment to capture various biometric informations from a face for identity recognition.
Figure 4:
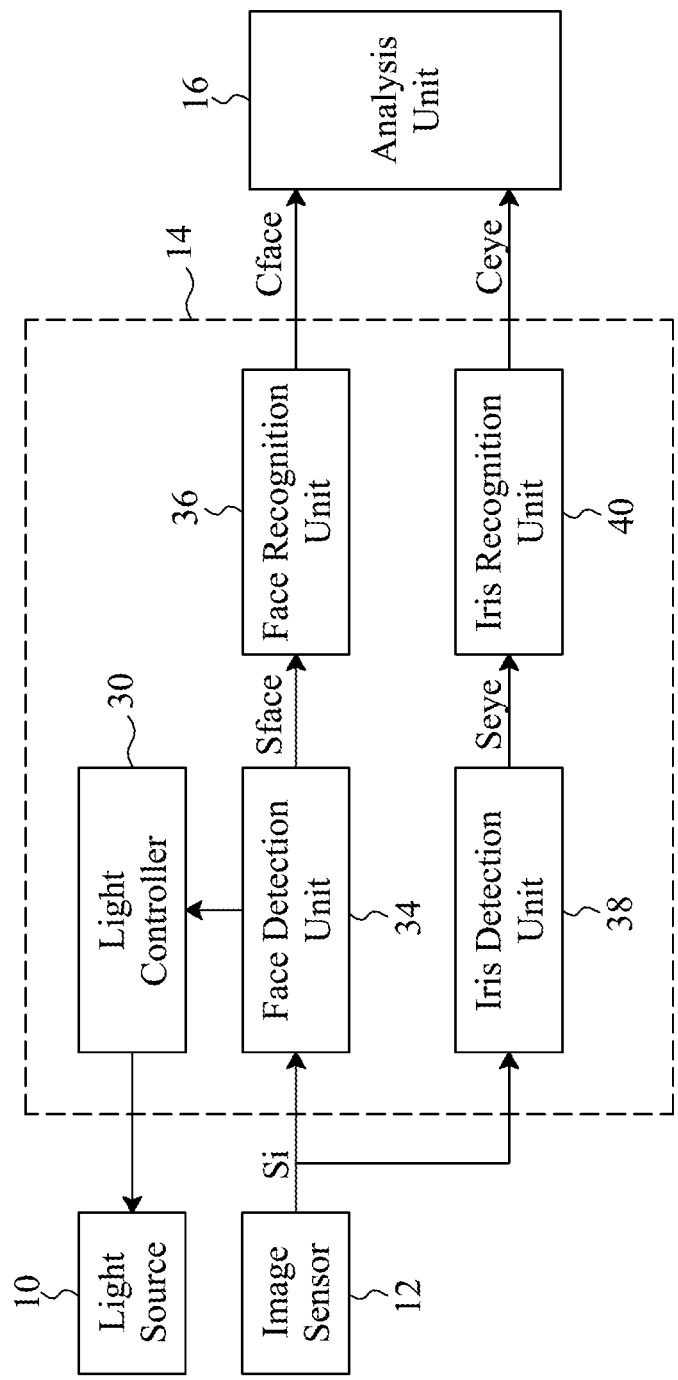
FIG. 4 is an embodiment of the recognition module shown in FIG. 3.

FIG. 3 shows another embodiment, which captures various biometric informations from a face 32 for identity recognition, and FIG. 4 is an embodiment of the recognition module 14 shown in FIG. 3. A face detection unit 34 coupled to the image sensor 12 receives the image signal Si and analyzes the image to detect presence and location of a face by using a face feature or a brightness variation of the image. If a face is detected, a face feature and an iris feature are further extracted from the image. For example, the face detection unit 34 may determine whether or not a face exists according to whether or not the image contains a face's outline or other face features. Alternatively, the face detection unit 34 may determine whether or not a face exists according to the brightness variation of the overall image. The face detection unit 34 will generate a face signal Sface according to the face feature for a face recognition unit 36. Then the face recognition unit 36 analyzes the face feature and compares it with face features preloaded in a face database to generate a face matching score Cface. Likewise, an iris detection unit 38 coupled to the image sensor 12 will generate an iris signal Seye according to an iris feature for an iris recognition unit 40, and the iris recognition unit 40 analyzes the iris feature and compares it with iris features preloaded in an iris database to generate an iris matching score Ceye. The analysis unit 16 works as described in the above embodiments. According to the face matching score Cface and the iris matching score Ceye, the user under recognition is identified as an authorized or unauthorized user.

Figure 5:
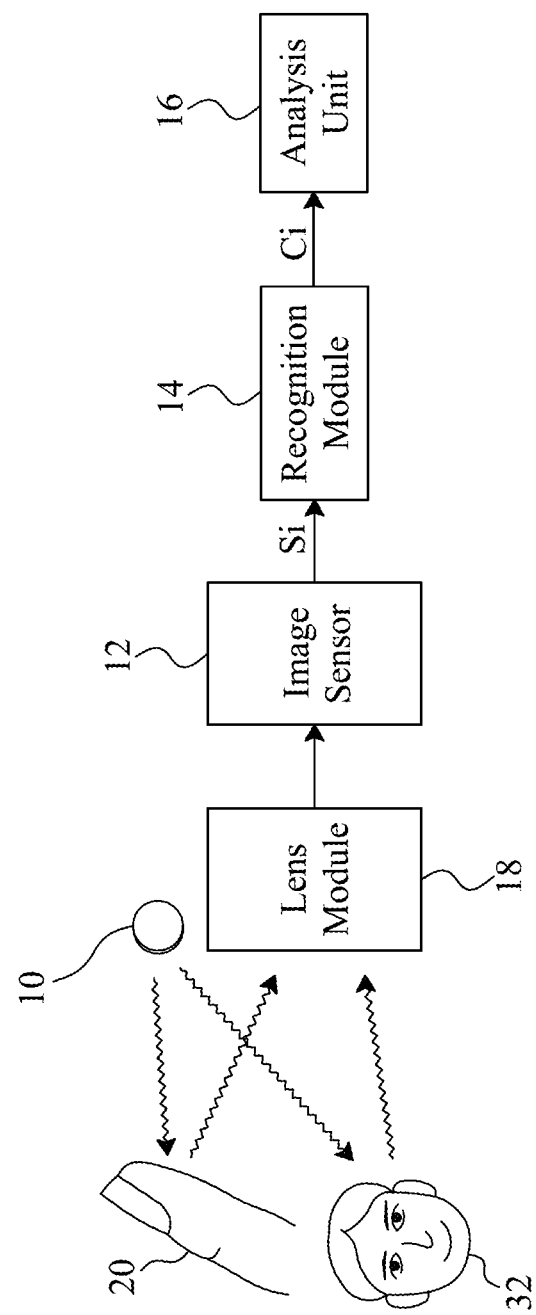
FIG. 5 shows an embodiment to capture various biometric informations from a finger and a face for identity recognition.
Figure 6:
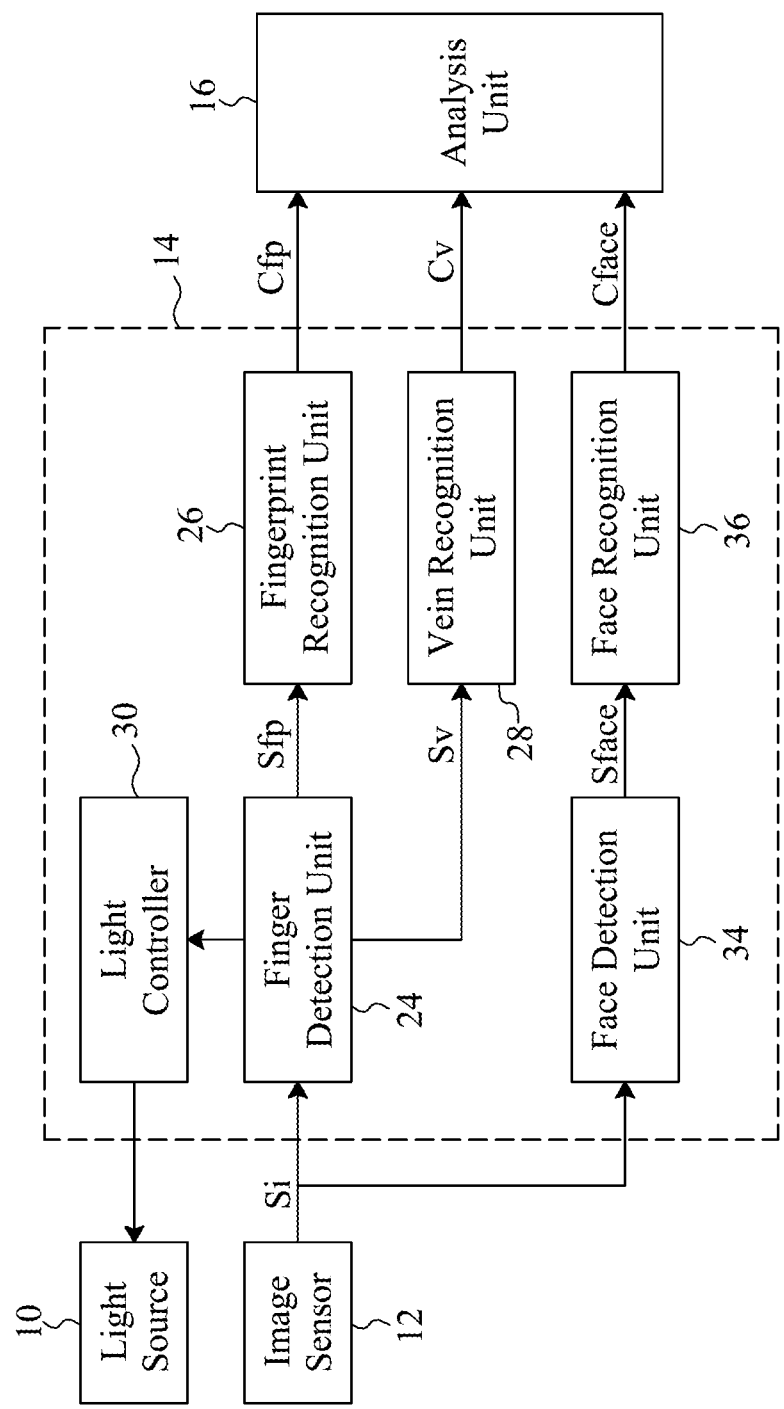
FIG. 6 is an embodiment of the recognition module shown in FIG. 5.

In FIG. 5 and FIG. 6, an embodiment is shown to illustrate extracting various biometric informations from a finger 20 and a face 32 for identity recognition, including fingerprint comparison, vein comparison, and face comparison whose operations are the same as described in the previous embodiments. In a system and method according to the present invention, when more biometric items are used for recognition, the resultant recognition rate is higher, and the comparative criteria for each feature comparison are allowed to be less strict. In addition, since the analysis unit 16 specifies the identity of a user according to all of the matching scores, the criteria for determination and the comparative criteria for each feature are highly flexible, and may be adjusted according to practical needs or hardware performance. For instance, when the image sensor 12 used is a low-definition one, the comparative criteria for some feature may be tightened, while the comparative criteria for some other feature are loosened. For example, the comparative criteria for the vein feature or the weight of the vein matching score may be adjusted according to the ambient temperature or the vein feature may be not considered for identity recognition when the ambient temperature is low.

Figure 7:
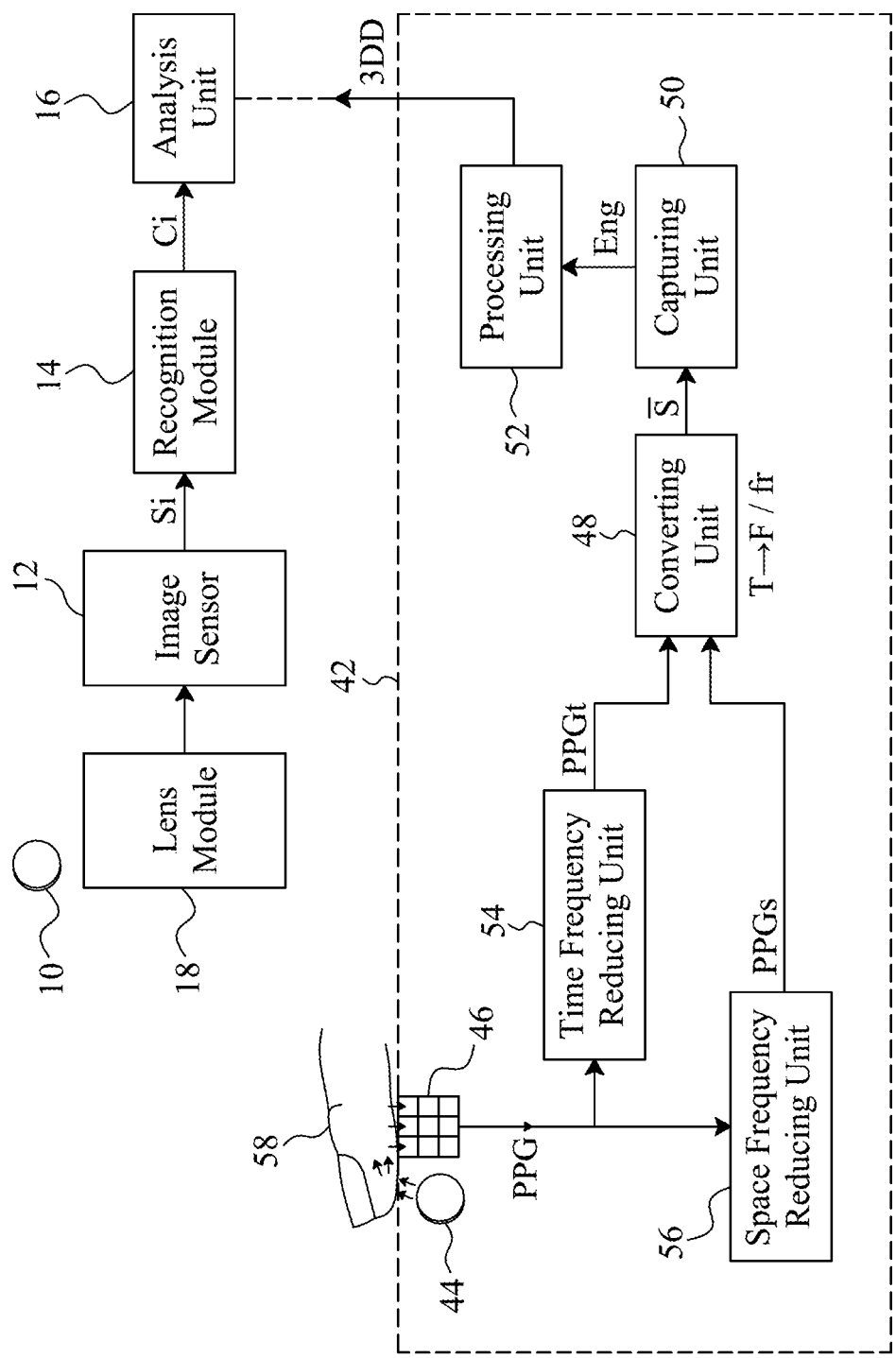
FIG. 7 illustrates another system and method based on hybrid biometric detection according to the present invention.

FIG. 7 illustrates another system and method according to the present invention, which further includes a biometric detection system 42 in addition to the elements of the above embodiments as shown in FIGS. 1, 3 and 5. In this embodiment, the biometric detection system 42 includes a light source 44, an image sensor 46 (shown as an image sensing array herein), a converting unit 48, a capturing unit 50, a processing unit 52, a time frequency reducing unit 54, and a space frequency reducing unit 56. The elements 10-18 operate as illustrated in the above embodiments, and the biometric detection system 42 is illustrated in the following.

The light source 44 may include an infrared light emitting diode or a red light emitting diode for example, and is configured to emit light to illuminate a skin surface of the user 58 and pass through the skin to reach the human tissue. Then the human tissue dispenses the light which is received by the image sensor 72. Those skilled in the art may design the spacing between the light source 44 and the image sensor 72 based on their actual need so long as the image sensor 72 is able to sense the light emitted by the light source 44 to measure the blood volume change in the peripheral vessels of the user 58. The image sensor 72 is able to generate image signals based on the received light for generating photoplethysmogram (PPG) signals according to the received light. The PPG signal refers to a signal representative of the result of optically measuring the blood volume changes in the peripheral vessels (e.g., arterioles) with each cardiac beat of the user. The blood flow in a vessel changes periodically with each cardiac beat, PPG thus can detect the blood volume changes through measuring the amount of light absorption of blood vessels. That is, PPG can utilize light sensing element to sense the blood volume changes and generate PPG signals, correspondingly, hence the amplitude of a PPG signal is proportional to the change in blood flow in the human body. At the same time, the period of a PPG signal is also corresponding to the period of each cardiac beat.

The time frequency reducing unit 54 is configured to generate a time and PPG variation signal, PPGt, for each frame captured by the image sensor 46, and the converting unit 48 is configured to convert the PPGt signals into frequency domain according to conventional frequency converting principle, such as Fourier Transformation.

The space frequency reducing unit 56 is configured to generate a space and PPG variation signal, PPGs, for each frame captured by the image sensor 46, and the converting unit 48 is configured to determine a reference frequency fr according to the PPGs signals.

The capturing unit 50 is configured to retrieve the reference frequency energy of the frequency domain signals $\overline{S}$ and deliver it to the processing unit 52 for establishing a three-dimensional energy distribution 3DD for later PPG analysis, for example at the analysis unit 16.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A system based on hybrid biometric detection, comprising:
   a first light source being configured to provide light of different wavelengths under control to project on a user;
   a first image sensor being configured to capture images of the user to generate image signals;
   a recognition module being coupled to the image sensor and configured to receive the image signals, extract various biometric informations from the images, and analyze and compare for each of the biometric informations to generate a matching score;
   an analysis unit being coupled to the recognition module and configured to determine an identity for the user according to all of the matching scores generated by the recognition module; and
   a biometric detection system which comprises:
   a second light source being configured to emit to illuminate a skin surface of the user;
   a second image sensor being configured to receive dispensed light from the user for generating PPG signals;
   a time frequency reducing unit being coupled to the second image sensor and configured to generate a time and PPG variation signal for each frame captured by the second image sensor;
   a space frequency reducing unit being coupled to the second image sensor and configured to generate a space and PPG variation signal for each frame captured by the second image sensor;
   a converting unit being coupled to the time frequency reducing unit and the space frequency reducing unit, and configured to convert the time and PPG variation signals into frequency domain signals and determine a reference frequency according to the space and PPG variation signals;
   a capturing unit being coupled to the converting unit and configured to retrieve energy of the frequency domain signals at the reference frequency; and
   a processing unit being coupled to the capturing unit and configured to establish a three-dimensional energy distribution.

2. The system of claim 1, wherein the various biometric informations comprise a fingerprint feature and a vein feature.

3. The system of claim 2, wherein the recognition module comprises:
- a finger detection unit being coupled to the first image sensor and configured to analyze the first images by a finger feature or a brightness variation of the first images to detect presence and location of a finger, and extract the fingerprint feature and the vein feature from the first images;
- a fingerprint recognition unit being coupled to the finger detection unit and configured to analyze and compare the fingerprint feature to generate a fingerprint matching score; and
- a vein recognition unit being coupled to the finger detection unit and configured to analyze and compare the vein feature to generate a vein matching score.

4. The system of claim 3, wherein the analysis unit compares a sum of the fingerprint matching score and the vein matching score with a threshold to determine the identity of the user.

5. The system of claim 3, wherein the analysis unit compares the fingerprint matching score and the vein matching score with two thresholds, respectively, to determine the identity of the user.

6. The system of claim 1, wherein the various biometric informations comprise a face feature and an iris feature.

7. The system of claim 6, wherein the recognition module comprises:
- a face detection unit being coupled to the first image sensor and configured to analyze the image by the face feature or a brightness variation of the first images to detect presence and location of a face, and extract the face feature from the first images;
- a face recognition unit being coupled to the face detection unit and configured to analyze and compare the face feature to generate a face matching score;
- an iris detection unit being coupled to the first image sensor and configured to extract the iris feature from the first images; and
- an iris recognition unit being coupled to the iris detection unit and configured to analyze and compare the iris feature to generate an iris matching score.

8. The system of claim 7, wherein the analysis unit compares a sum of the face matching score and the iris matching score with a threshold to determine the identity of the user.

9. The system of claim 7, wherein the analysis unit compares the face matching score and the iris matching score with two thresholds, respectively, to determine the identity of the user.

10. The system of claim 1, wherein the various biometric informations comprise a fingerprint feature, a vein feature, and a face feature.

11. The system of claim 10, wherein the recognition module comprises:
- a finger detection unit being coupled to the first image sensor and configured to analyze the first images by a finger feature or a brightness variation of the first images to detect presence and location of a finger, and extract the fingerprint feature and the vein feature from the first images;
- a fingerprint recognition unit being coupled to the finger detection unit and configured to analyze and compare the fingerprint feature to generate a fingerprint matching score;
- a vein recognition unit coupled to the finger detection unit and configured to analyze and compare the vein feature to generate a vein matching score;
- a face detection unit being coupled to the image sensor and configured to analyze the image by the face feature or a brightness variation of the first images to detect presence and location of a face, and extract the face feature from the first images; and
- a face recognition unit being coupled to the face detection unit and configured to analyze and compare the face feature to generate a face matching score.

12. The system of claim 11, wherein the analysis unit compares a sum of the fingerprint matching score, the vein matching score, and the face matching score with a threshold to determine the identity of the user.

13. The system of claim 11, wherein the analysis unit compares the fingerprint matching score, the vein matching score, and the face matching score with three thresholds, respectively, to determine the identity of the user.

14. The system of claim 1, further comprising a light controller being coupled to the first light source and configured to adjust a light intensity of the first light source.

15. The system of claim 1, further comprising an autofocus lens module between the first image sensor and the user.

16. A method based on hybrid biometric detection, comprising steps of:
- a.) providing first light of different wavelengths to project on a user;
- b.) capturing first images of the user;
- c.) extracting various biometric informations from the first images;
- d.) analyzing and comparing for each of the biometric informations to generate a matching score;
- e.) determining an identity for the user according to all of the matching scores generated in the step d;
- f.) providing second light to emit to illuminate a skin surface of the user;
- g.) receiving dispensed second light from the user for generating second images and PPG signals;
- h.) generating a time and PPG variation signal for each frame of the second images;
- i.) generating a space and PPG variation signal for each frame of the second images;
- j.) converting the time and PPG variation signals into frequency domain signals and determining a reference frequency according to the space and PPG variation signals;
- k.) retrieving energy of the frequency domain signals at the reference frequency from the signals generated in the step j; and
- l.) establishing a three-dimensional energy distribution from the retrieved energy generated in the step k.

17. The method of claim 16, wherein the step c comprises extracting a fingerprint feature and a vein feature.

18. The method of claim 17, wherein the step d comprises:
- analyzing and comparing the fingerprint feature to generate a fingerprint matching score; and
- analyzing and comparing the vein feature to generate a vein matching score.

19. The method of claim 18, wherein the step e comprises comparing a sum of the fingerprint matching score and the vein matching score with a threshold to determine the identity of the user.

20. The method of claim 18, wherein the step e comprises comparing the fingerprint matching score and the vein matching score with two thresholds, respectively, to determine the identity of the user.

21. The method of claim 16, wherein the step c comprises extracting a face feature and an iris feature.

22. The method of 21, wherein the step d comprises:
analyzing and comparing the face feature to generate a face matching score; and
analyzing and comparing the iris feature to generate an iris matching score.

23. The method of 22, wherein the step e comprises comparing a sum of the face matching score and the iris matching score with a threshold to determine the identity of the user.

24. The method of 22, wherein the step e comprises comparing the face matching score and the iris matching score with two thresholds, respectively, to determine the identity of the user.

25. The method of 16, wherein the step c comprises extracting a fingerprint feature, a vein feature, and a face feature.

26. The method of 25, wherein the step d comprises:
analyzing and comparing the fingerprint feature to generate a fingerprint matching score;
analyzing and comparing the vein feature to generate a vein matching score; and
analyzing and comparing the face feature to generate a face matching score.

27. The method of 26, wherein the step e comprises comparing a sum of the fingerprint matching score, the vein matching score, and the face matching score with a threshold to determine the identity of the user.

28. The method of 18, wherein the step e comprises comparing the fingerprint matching score, the vein matching score, and the face matching score with three thresholds, respectively, to determine the identity of the user.

29. The method of 16, further comprising generating a control signal according to a brightness of the first images for adjusting an intensity of the first light.

30. The method of 16, wherein the step b comprises adjusting a focal length for capturing the first images from a different depth of field.

* * * * *